(12) United States Patent
Krywitsky

(10) Patent No.: US 7,077,436 B1
(45) Date of Patent: Jul. 18, 2006

(54) GEAR OPERATED COUPLER

(75) Inventor: Lee A. Krywitsky, Calgary (CA)

(73) Assignee: Hilltap Fittings, LTD., Calgary (CA)

( * ) Notice: Subject to any disclaimer, the term of this patent is extended or adjusted under 35 U.S.C. 154(b) by 0 days.

(21) Appl. No.: 10/430,458

(22) Filed: May 6, 2003

Related U.S. Application Data

(60) Provisional application No. 60/380,091, filed on May 6, 2002.

(51) Int. Cl.
*F16L 25/00* (2006.01)

(52) U.S. Cl. .................. 285/912; 285/354; 285/920
(58) Field of Classification Search ........... 285/912, 285/920, 354
See application file for complete search history.

(56) References Cited

U.S. PATENT DOCUMENTS

| | | | |
|---|---|---|---|
| 2,795,985 A * | 6/1957 | Wilson et al. | 81/57.15 |
| 2,907,242 A * | 10/1959 | Chakroff | 81/57.15 |
| 3,239,245 A * | 3/1966 | Press et al. | 285/18 |
| 5,058,929 A * | 10/1991 | Zentner et al. | 285/39 |
| 6,254,147 B1 * | 7/2001 | Edwards | 285/334.4 |
| 6,279,968 B1 * | 8/2001 | Stoll et al. | 285/361 |

FOREIGN PATENT DOCUMENTS

| | | | | |
|---|---|---|---|---|
| GB | 707988 | * | 4/1954 | 285/912 |
| NO | 102299 | * | 8/1963 | 285/912 |

* cited by examiner

*Primary Examiner*—James M. Hewitt
(74) *Attorney, Agent, or Firm*—Workman-Nydegger

(57) ABSTRACT

A gear operated coupler is provided for coupling and uncoupling mating first and second coupling portions of a piping system component. A sleeve with an attached spur gear includes threads that engage the first coupling portion, and the sleeve slidingly receives the second coupling portion. The coupling portions are maintained in a metal-to-metal seal arrangement by a compensation ring in the sleeve. A pinion plate, carrying an associated pinion gear, is attached to the second coupling portion so that the pinion gear engages the spur gear. A torque applied to an operating nut connected to the pinion gear shaft causes the pinion gear and spur gear to rotate. Depending on the direction of rotation of the pinion gear, the threads of the sleeve advance the first coupling portion toward the second coupling portion until the two are coupled, or the first coupling portion is retracted from the second coupling portion.

33 Claims, 4 Drawing Sheets

GEAR OPERATED COUPLER

RELATED APPLICATIONS

This application claims priority to U.S. Provisional Patent Application Ser. No. 60/380,091 entitled "GEAR OPERATED COUPLER," filed May 6, 2002, and incorporated herein in its entirety by this reference.

BACKGROUND OF THE INVENTION

1. Field of the Invention

The present invention relates generally to systems and devices for coupling and uncoupling portions of mechanical assemblies. More particularly, exemplary embodiments of the invention concern a gear operated coupler suitable for use in coupling and uncoupling mating portions of piping systems and piping system components.

2. Related Technology

Piping systems and components are used in the management of a wide variety of materials and are employed in a virtually endless number of different applications. Such materials may be present in a variety of different states including gases, liquids, slurries, semisolids, and various combinations thereof and may be found in applications as varied as oil and gas collection and processing, wastewater collection and processing, industrial waste processing applications, nuclear systems and nuclear waste processing applications, radioactive materials handling, agricultural applications, food processing, and cryogenic applications.

As suggested by the foregoing, piping systems and components have been developed for use with materials whose nature may range from the benign, such as drinking water, to the deadly, such as radioactive waste. Likewise, the operating temperatures of such systems and components can vary from relatively cold temperatures, such as in cryogenic applications, to relatively high temperatures, such as in reactor piping systems. In similar fashion, system operating pressures may vary widely from one application to another.

Due to the potential danger posed to life and property by hazardous materials and/or by extreme operating conditions, various systems and components have been developed in an attempt to minimize, or at least reduce, the risk of the harm that would likely attend an uncontrolled release of piping system contents. Generally, such systems and components reflect various approaches to the reduction of such risks.

At the component level, for example, piping system components have been designed and constructed that include various safety features and heavy duty construction that are intended to minimize the chances of component failure and an uncontrolled release of system materials. In other instances, systems and components have been developed that include features that are intended to minimize the chance that an operator or other personnel, or property, will be harmed if an uncontrolled release of system materials should occur.

Such systems and components have nonetheless proven to be of limited effectiveness in many cases. In particular, a number of these systems and components are overly complex and unreliable. Moreover, such systems and components typically lack the robustness necessary for long-term effective use in demanding environments and operating conditions.

In view of the foregoing, it would be useful to provide a gear operated coupler that implements secure, reliable and effective connections in piping systems and components. Additionally, the gear operated coupler should enable ready coupling and uncoupling of piping system components. Finally, the gear operated coupler should be configured so that its operation can be effectuated from a remote location.

BRIEF SUMMARY OF AN EXEMPLARY EMBODIMENT OF THE INVENTION

Generally, exemplary embodiments of the invention relate to systems and devices for coupling and uncoupling portions of mechanical assemblies. More specifically, exemplary embodiments of the invention concern a gear operated coupler suitable for use in coupling and uncoupling mating portions of piping systems or piping system components.

In one exemplary implementation, the gear operated coupler is configured for use in coupling and uncoupling male and female coupling portions of a piping system. The male and female coupling portions are configured to mate with each other and are partially received within a sleeve that facilitates the coupling and uncoupling procedures.

More particularly, the male coupling portion includes a set of external threads configured to engage internal threads defined by the sleeve. Further, the male coupling portion defines an annular channel configured to receive a corresponding annular ridge defined by the female coupling portion, so that a metal-to-metal seal is formed between the female coupling portion and the male coupling portion when they are joined together by the sleeve. A compensation ring serves to bias and retain the female coupling portion in a predetermined orientation within the sleeve and/or with respect to the male coupling portion.

In addition to the threads by which the male coupling portion is engaged, the sleeve further includes an integral spur gear configured and arranged to engage a pinion gear mounted on a shaft received by a pinion plate that is mounted about the female coupling portion. An operating nut is disposed on the shaft at the end opposite the pinion gear.

In operation, a torque applied to the operating nut attached to the shaft of the pinion gear causes the pinion gear to rotate. As the pinion gear rotates, the teeth of the pinion gear cause a corresponding rotation of the sleeve by way of the spur gear that is attached to the sleeve. Depending on the direction of rotation of the pinion gear, spur gear, and sleeve, the internal threads of the sleeve either advance the male coupling portion into contact with the female coupling portion so as to couple the male and female coupling portions together, or alternatively, the rotation of the sleeve will cause the male coupling portion to be retracted, thereby uncoupling the male coupling portion and the female coupling portion from each other.

In this way, the female coupling portion and male coupling portions can be readily coupled or uncoupled, by way of the gear operated coupler, according to the requirements of a particular situation or application. Moreover, the operating nut, when connected to a suitable system, enables these operations to be implemented from a location remote from the gear operated coupler.

The foregoing, and other, aspects of exemplary embodiments of the invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF SELECTED EMBODIMENTS OF THE INVENTION

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale. Moreover, while various headings are employed in the following discussion, such headings are included solely for the purpose of organizing and facilitating the disclosure hereof and are not intended, nor should they be construed, to define the invention or limit the scope of the invention in any way.

As discussed below, exemplary embodiments of the invention are suitable for use in connection with the coupling and uncoupling of mating portions of a component or piping system. More generally however, embodiments of the invention may be employed in conjunction with any other system or device with respect to which it is desired to implement one or more aspects of the functionality disclosed herein. Thus, the scope of the invention should not be construed to be limited solely to piping system and component applications.

Figure 1:
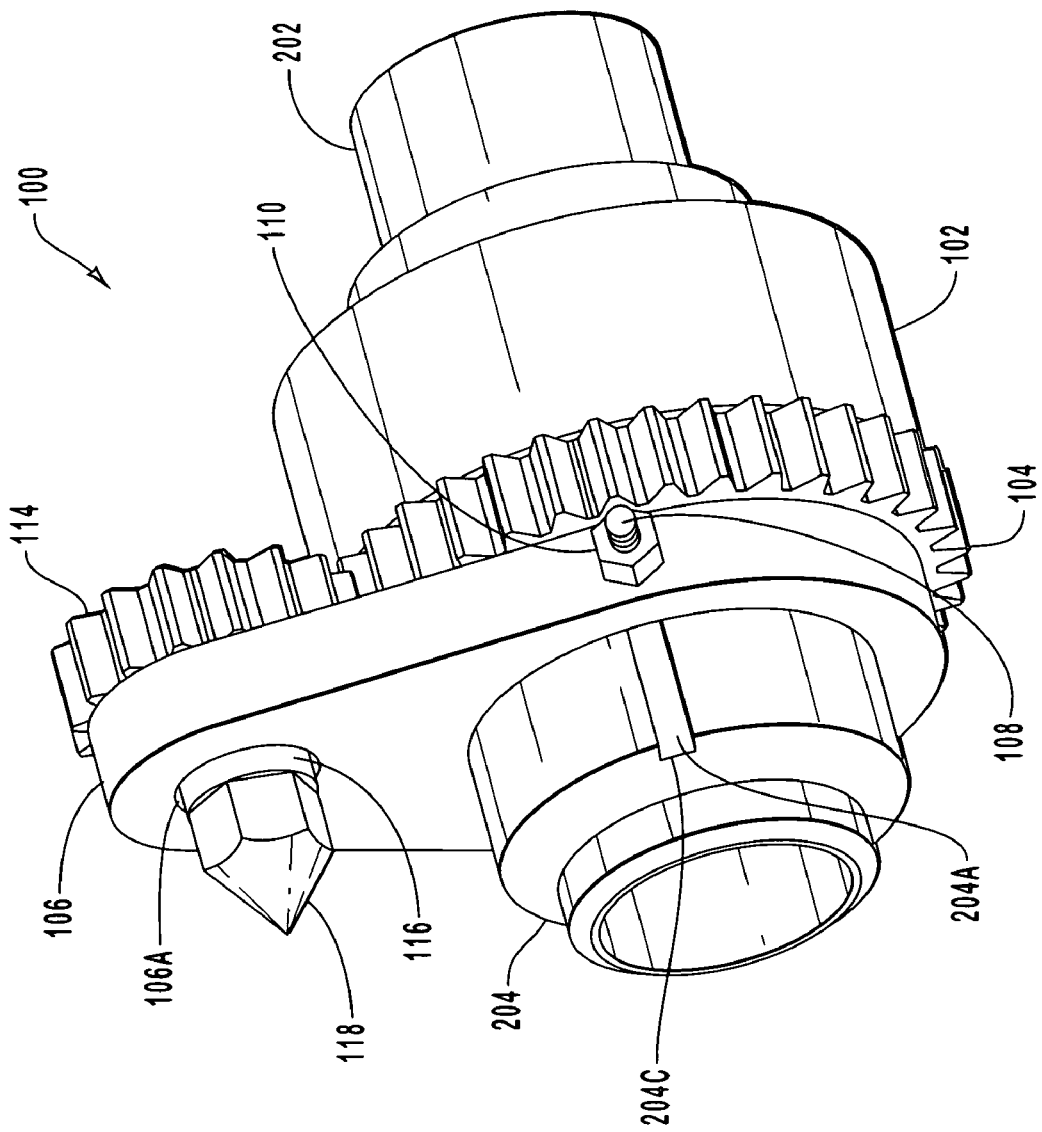
FIG. 1 is a perspective view illustrating various aspects of an exemplary implementation of a gear operated coupler.

Directing attention now to FIG. 1, details are provided concerning an exemplary implementation of a gear operated coupler, indicated generally at 100. In this exemplary implementation, the gear operated coupler 100 is configured for use in connection with first and second coupling portions 202 and 204, respectively. In the illustrated embodiment, the first coupling portion is a male pipe fitting and the second coupling portion comprises a female pipe fitting. Generally, such first and second coupling portions 202 aid 204 may comprise elements of a wide variety of different components.

In some exemplary implementations, the first and second coupling portions comprise elements of a piping system component. Examples of such piping system components include valves and takedown joints. In other implementations, the first and second coupling portions comprise elements of a pipe or tube fitting, such as a reducer or coupling that serves to couple two pieces of pipe or tube together. More generally however, the first and second coupling portions may comprise elements of any of a variety of different mechanical assemblies.

Moreover, the first and second coupling portions may be configured to interface with piping, tubing, or piping system components in a variety of different ways. By way of example, in a case where the first and second coupling portions comprise elements of a pipe or tube coupling, the first portion may be configured to mate with tubing or pipe of one size, while the second portion is configured to mate with tubing or pipe of a another size. As another example, one of the coupling portions may comprise a male pipe or tubing fitting, while the other coupling portion comprises a female pipe or tubing fitting. In other implementations, the coupling portions are both male, or both female. Further, one or both of the coupling portions can be configured in various ways so as to facilitate implementation of various forms of pipe and tubing connections such as, but not limited to, threaded, brazed, welded or socket welded connections.

With continuing attention now to FIG. 1, the gear operated coupler 100 further includes a sleeve 102 about which is disposed a spur gear 104. In some implementations, the spur gear 104 is integral with the sleeve 102 while, in other cases, the spur gear 104 comprises a discrete element that is attached about the sleeve 102 by brazing, welding or any other suitable process. Elements relating to the design of the spur gear such as, for example, the number and type of teeth, pitch, and major and minor diameters, may be varied as necessary to suit the requirements of a particular application.

Abutting the sleeve 102 is a pinion plate 106 that defines an opening sufficient to accommodate the outside diameter of the second coupling portion 204 or, alternatively, the pinion plate 106 may be configured to be attached to the first coupling portion 202. The pinion plate 106 includes one or more guide pins that pass through the edge of the pinion plate 106 and, as discussed below, aid in the positioning and retention of the pinion plate 106 with respect to the second coupling portion 204. Exemplarily, the guide pins are implemented as one or more bolts 108 and nuts 110, but any other suitable structures or devices, such as the spring loaded guide pins discussed below, may be employed.

Generally, the head of each bolt 108 of the pinion plate 106 is received in a corresponding guide slot 204A that is defined in the second coupling portion 204. In particular, the head of the bolt passes through entry 204C, moving along the guide slot 204A until reaching the end (not shown) of the guide slot 204A. This arrangement substantially prevents rotational movement of the pinion plate 106 relative to the second coupling portion 204. Further, the nuts 110, when sufficiently tightened, substantially prevent any axial movement of the pinion plate 106 relative to the second coupling portion 204.

As suggested above, various types of guide pins may be employed in the retention of the pinion plate 106 relative to the second coupling portion 204. In the case where the guide pins are spring loaded, the guide slot, or slots, 204A defines a recessed portion, proximate the end of the guide slot, that is slightly deeper than the rest of the slot. This slot configuration permits the spring loaded pin to extend into the recessed portion. Thus configured and positioned, the guide pins and guide slots cooperate to substantially prevent radial and axial movement of the pinion plate 106 relative to the second coupling portion 204.

With continuing attention now to various aspects of the pinion plate 106, a pinion shaft hole 106A is defined in the pinion plate 106A and is configured and arranged to receive a pinion shaft 112 (see FIG. 2) upon which is mounted a pinion gear 114. A bushing 116 serves to position and retain the pinion shaft 112 in the pinion shaft hole 106A. In some implementations, the bushing 116 may be supplemented with, or replaced with, a suitable bearing, such as a ball bearing. As further indicated in FIG. 1, an operating nut 118 is provided that is attached to the terminal portion of the pinion shaft 112.

While details concerning the operation of the gear operated coupler are disclosed elsewhere herein, the pinion gear 114 is, in general, configured and arranged to operably engage the spur gear 104 so that a rotation of the pinion gear 114 causes a corresponding rotation of the spur gear 104 and, thus, a rotation of the sleeve 102 to which the spur gear 114 is attached. As in the case of the spur gear 104, aspects of the configuration of the pinion gear 114, such as number and type of teeth, pitch, and major and minor diameters, may be varied as necessary to suit the requirements of a particular application.

Figure 2:
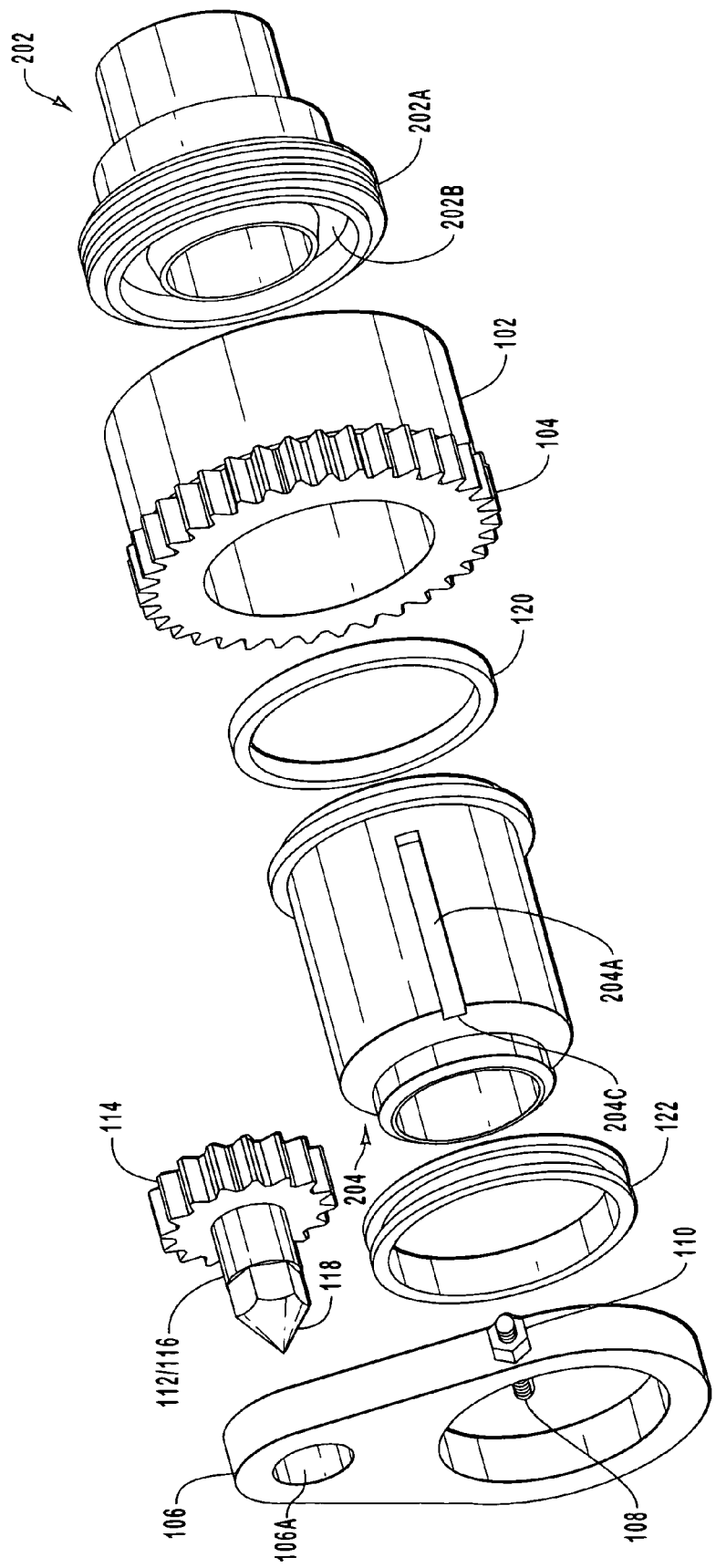
FIG. 2 is an exploded view illustrating various aspects of an exemplary implementation of a gear operated coupler.
Figure 3:
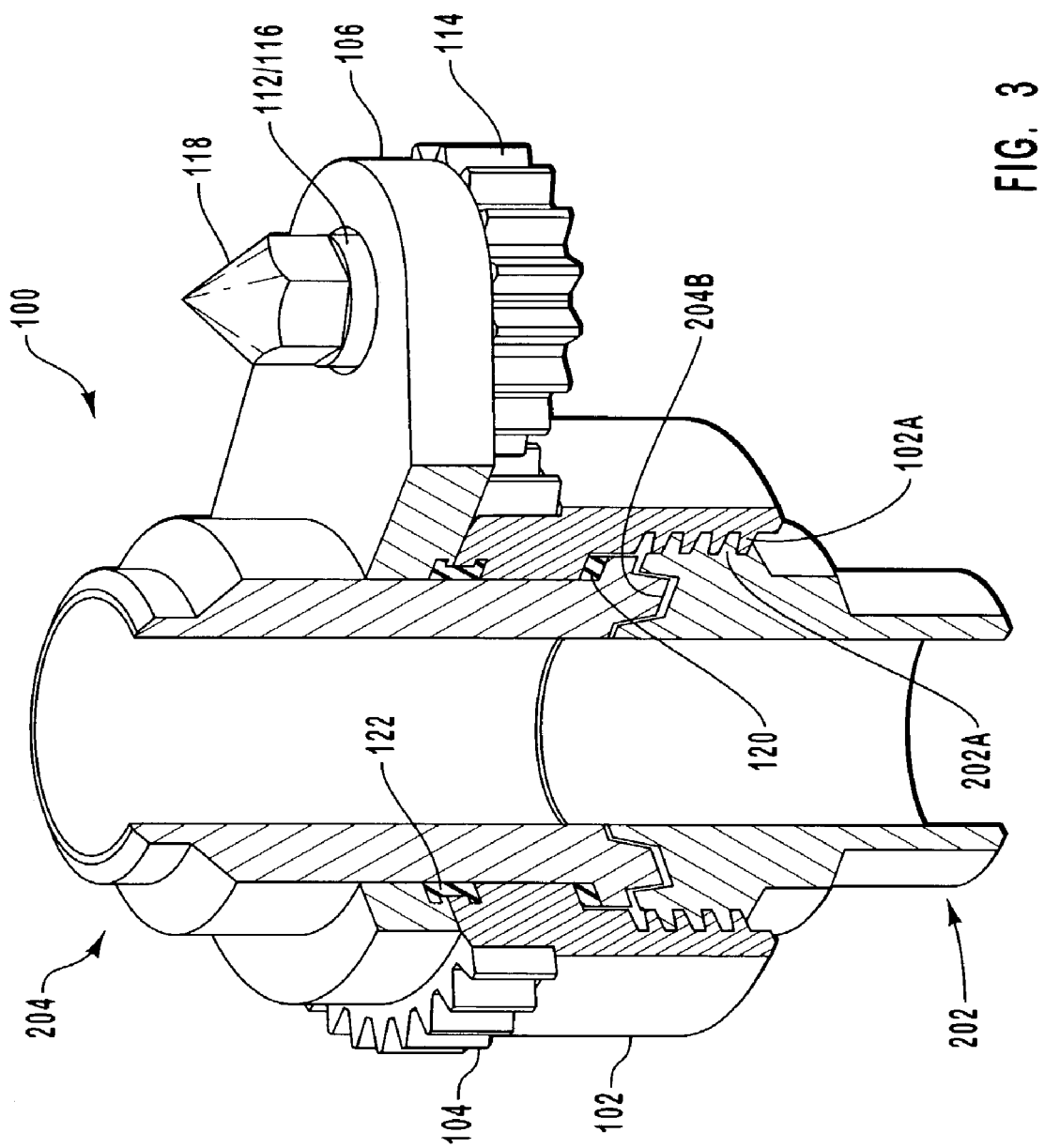
FIG. 3 is a section view illustrating various aspects of an exemplary implementation of a gear operated coupler as used to couple portions of a piping system.

Directing attention now to FIGS. 2 and 3, further details are provided concerning the structure and operation of an exemplary implementation of the gear operated coupler 100. In particular, the first coupling portion 202 in connection with which the gear operated coupler 100 is employed includes a set of external threads 202A that are configured and arranged to engage a corresponding set of internal threads 102A defined by sleeve 102. An annular channel 202B is defined by the male portion 202 that is configured to receive a corresponding annular ridge 204B defined by the second coupling portion 204 so that, exemplarily, a metal-to-metal seal is formed between the second coupling portion 204 and the first coupling portion 202 when they are coupled together.

Exemplarily, the cross-section of the annular ridge 204B and, thus, the cross-section of the annular channel 202B, are implemented substantially in a wedge shape. However, other types of cross-sectional configurations may be employed as well. For example, semicircular and square cross-sections may be suitable in some applications. Further, the channel and ridge arrangement may be reversed so that, in some implementations, the channel is defined by the second coupling portion, while the ridge is defined by the first coupling portion. Accordingly, the scope of the invention should not be construed to be limited to the exemplary implementation indicated in FIG. 3.

While the illustrated embodiment discloses a thread connection between the sleeve 102 and the first coupling portion 202, various other arrangements may be employed. By way of example, the sleeve 102 and first coupling portion 202 may be configured to implement mating portions of a twist-lock configuration so that, for example, the sleeve 102 includes one or more pins that are configured to travel along corresponding grooves defined by the first coupling portion 202. In one exemplary implementation of this configuration, only a ninety degree rotation of the sleeve 102 is required to uncouple the first coupling portion 202 and the second coupling portion 204. Of course, various other degrees of rotation may alternatively be defined and employed.

In some alternative implementations, a sealing element, such as an O-ring, is interposed between the first coupling portion 202 and the second coupling portion 204. Exemplarily, such a sealing element resides in the first coupling portion 202 proximate the annular channel 202B so that when the first coupling portion 202 and the second coupling portion 204 are coupled together, the annular ridge 204B of the second coupling portion 204 compresses the sealing element.

The relationship between the first coupling portion 202 and the second coupling portion 204 is further defined through the use of a compensation ring 120 that resides between the second coupling portion 204 and the sleeve 102. Among other things, the compensation ring 120 operates to bias and retain the second coupling portion 204 in a predetermined orientation within the sleeve 102 and/or with respect to the first coupling portion 202. Additionally, the bias imposed by the compensation ring 120 provides for maintenance of the metal-to-metal seal between the second coupling portion 204 and the first coupling portion 202 and substantially prevents "creeping," or degradation of the metal-to-metal seal, which may otherwise occur as a result of low temperature-induced thermal contraction. Thus, the compensation ring 120 is useful in cryogenic applications and in those applications where the piping system is otherwise exposed to relatively low temperatures. In some alternative implementations, the compensation ring 120 is omitted.

Some exemplary implementations of the gear operated coupler 100 further include a retention ring 122 configured and arranged to be received in a corresponding channel cooperatively defined by the pinion plate 106 and the sleeve 102. Generally, the retention ring 122 cooperates with the bolts 108 (FIG. 1) to substantially prevent relative axial movement between the sleeve 102 and the pinion plate 106.

As suggested by the preceding discussion, the first and second coupling portions 202 and 204 typically comprise metal. Exemplary metals for these portions, and for the various components of the gear operated coupler 100 include steel and steel alloys, such as the stainless steels. More generally however, the selection and use of materials for the first and second coupling portions 202 and 204, as well as for the components of the gear operated coupler 100 will be largely dictated by factors such as, but not limited to, the piping system operating pressure and temperature, the nature of the materials carried within the piping system, and the ambient conditions wherein the piping system operates.

In similar fashion, where the gear operated coupler 100 is implemented in connection with systems or devices other than piping systems, the materials selected and used for the various components of the gear operated coupler 100 will be determined in large part by the system operating requirements and operating environment considerations. Accordingly, the scope of the invention should note be construed to be limited to any particular types or combinations of materials.

As suggested by the foregoing, the relatively small size and compactness of the gear operated coupler permits it to be installed and employed in relatively confined spaces that personnel cannot access and/or where tools such as wrenches cannot be readily employed. Various specific operational aspects of exemplary implementations of the gear operated coupler are considered below.

With continuing attention now to FIGS. 1 through 3, consideration will be given to various operational aspects of the exemplary embodiment of the gear operated coupler 100. Initially, the second coupling portion 204 is inserted into the sleeve 102 until the second coupling portion 204 comes into contact with the compensation ring 120, as illustrated in FIG. 3 for example. The first coupling portion 202 is then inserted into the sleeve 102. A torque is then applied to the operating nut 118 attached to the shaft of the pinion gear 114 so as to cause the pinion gear 114 to rotate. As the pinion gear 114 rotates, the teeth of the pinion gear 114, engaged with the teeth of the spur gear 104, cause a corresponding rotation of the spur gear 104 and, thus, the sleeve 102.

Depending on the direction of rotation of the pinion gear 114, spur gear 104, and sleeve 102, the internal threads 102A of the sleeve 102 will either advance the first coupling portion 202 into contact with the second coupling portion 202 so as to couple the first and second coupling portions 202 and 204, respectively, together or alternatively, the rotation of the sleeve 102 will cause the first coupling portion to be retracted, relative to the second coupling portion 204, thereby uncouple the first and second coupling portions 202 and 204, respectively, from each other. In this way, the first and second coupling portions 202 and 204, respectively, can be desirably coupled or uncoupled, by way of the gear operated coupler 100, according to the requirements of a particular situation or application.

Accordingly, one aspect of exemplary implementations of the gear operated coupler 100 is that mating portions of a piping system or piping system component can be readily and reliably coupled and uncoupled. Moreover, the compensation ring, for example, helps to assure an effective, reliable and repeatable seal between such mating portions, even in low temperature conditions. Additionally, the sleeve of the gear operated coupler enables the controlled uncoupling of the mating portions of a piping system or piping system component so that if, for example, residual pressure remains in the line, the uncoupling of the mating portions can be performed as slowly as necessary to ensure a controlled release of the line pressure. Further, the threads of the first coupling portion, for example, and the sleeve threads cooperate to offer significant resistance to an explosive or uncontrolled decoupling of the mating portions. As well, such threads, in cooperation with the operating nut, enable rapid coupling of the mating portions should the need arise.

In a related vein, the configuration of the gear operated coupler enables a user to bring a significant amount of torque to bear when performing a particular operation so that, for example, a user can readily couple and uncouple mating portions of a wide variety of mechanical assemblies, valves, and couplings with relative ease. This aspect of the invention is particularly useful where the gear operated coupler is employed in connection with relatively large nominal valve sizes, such as 8 inch and larger, that cannot be readily coupled or uncoupled with conventional pipe wrenches or similar tools.

The relatively high torque that can be applied with the gear operated coupler is also useful in coupling mating portions of mechanical assemblies, valves, and couplings where such components are configured such that significant torque must be applied in order to achieve the desired connection. One example of such an application is a metal-to-metal seating of members such as the wedge-shaped ridge 204B and channel 202B arrangement illustrated in FIG. 3. In addition, the gear operated coupler is likewise useful in uncoupling mating portions that have become stuck together, or otherwise resist uncoupling, for some reason.

As suggested earlier herein, it may be desirable in some cases to be able to couple and/or uncouple the first and second coupling portions from a remote location. Thus, in the event that the gear operated coupler is located and/or used in an environment where, for example, hazardous chemicals, radiation, or extreme heat or extreme cold are present, it is useful to be able to couple and uncouple the first and second coupling portions from a remote location, thereby avoiding exposure of the operator or other personnel to a potentially dangerous environment. Directing attention now to FIG. 4, details are provided concerning aspects of a system configured to address such concerns. While the illustrated system is useful in implementing certain operations concerning piping systems, such system is not so limited and, more generally, may be implemented in any other environment where the functionality disclosed herein my prove useful.

More particularly, a remote operation system 300 is provided that includes a remote operator 302 operably connected with a gear operated coupler 304 that is implemented in a piping system 400. Exemplarily, the remote operator 302 comprises a hydraulic actuation system that is connected with the operating nut of the gear operated coupler 304. Alternatively, the remote operator 302 comprises a human operated system of mechanical members and linkages connected to the operating nut 304, or comprises an electromechanical system that provides for motorized operation of mechanical members and linkages. In yet other cases, the remote operator 302 comprises suitable electronics, processors, and other hardware, as well as software in some cases, and is configured to transmit wireless, or hardwire, signals to a motorized operator (not shown) attached to the gear operated coupler 304, so as to control the operation of the gear operated coupler 304.

Of course, the foregoing are exemplary implementations only and the remote operation of the gear operated coupler 304 may be achieved by a variety of other comparable systems and components. Accordingly, the scope of the invention should not be construed to be limited solely to these exemplary implementations.

Figure 4:
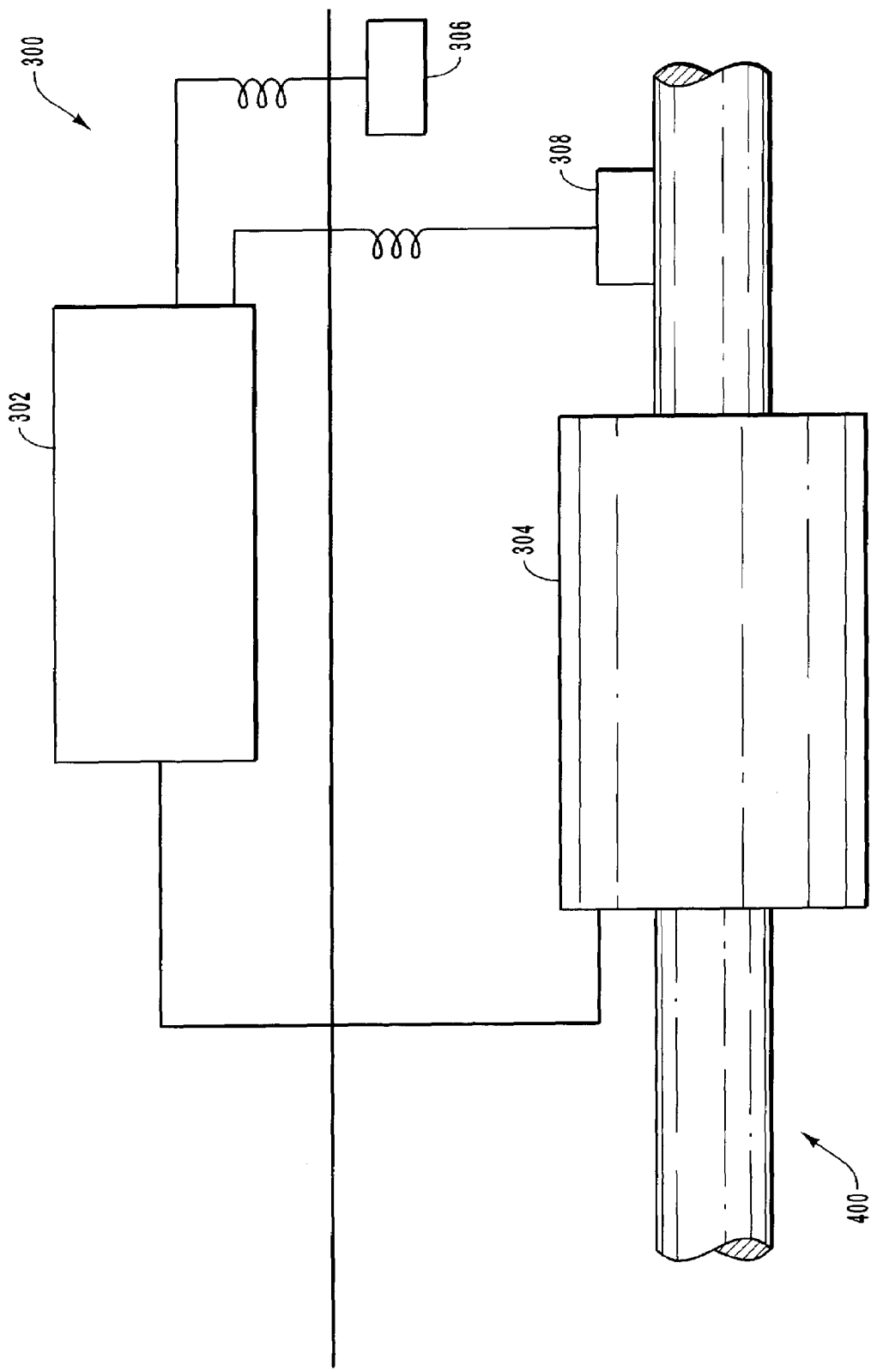
FIG. 4 is a schematic view an exemplary implementation of a gear operated coupler implemented in connection with a remote operating system.

As further indicated in FIG. 4, the exemplary remote operation system 300 further includes an environment sensor 306 and system sensor 308. Generally, the environment sensor 306 and system sensor 308 monitor and report on various predetermined aspects of the operating environment and system, respectively, such as, but not limited to, temperature, pressure, concentration, and chemical composition of various materials. The information obtained by way of such sensors is then transmitted by the sensors to the remote operator 302 by way of a hardwire, or wireless, connection.

The information thus gathered by the environment sensor 306 and system sensor 308 can be stored for later use and/or can be used to control the operation of the remote operator 302. For example, if the system sensor 308 indicates that the line pressure has dropped below a predetermined threshold, that information can be used to cause the gear operated coupler 304 to uncouple the mating portions of the system or component with which the gear operated coupler 304 is associated. As another example, if the system sensor 308 indicates that the line pressure exceeds a predetermined threshold, that information can be used to lock the remote operator 302 until the line pressure has dropped below that threshold. Further, if the environment sensor 306 indicates, for example, the presence of certain materials that could present a hazard if an uncoupling were to occur, that information could likewise be used to lock the remote operator 302 until the hazardous environmental condition had been remedied.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A gear operated coupler for use in connection with a device having first and second coupling portions configured to be mated together, the gear operated coupler comprising:
   a sleeve configured to engage one of the first and second coupling portions, said sleeve comprising inwardly projecting coupling means to engage an outer surface of the first or second coupling portions;
   a spur gear attached to said sleeve;
   a pinion plate removably linked to either the first or second coupling portion;

a means for preventing rotational movement of said pinion plate relative to either the first or second coupling portion;

a pinion gear configured to engage said spur gear; and an operating nut connected at least indirectly to said pinion gear.

2. The gear operated coupler as recited in claim 1, wherein said spur gear is integral with said sleeve.

3. The gear operated coupler as recited in claim 1, wherein said sleeve is configured to receive a portion of each of the first and second coupling portions.

4. The gear operated coupler as recited in claim 1, wherein said inwardly projecting coupling means comprises a set of internal threads configured and arranged for operative engagement with either the first or second coupling portion.

5. The gear operated coupler as recited in claim 1, wherein said inwardly projecting coupling means includes at least one pin configured and arranged for operative engagement with either the first or second coupling portion.

6. The gear operated coupler as recited in claim 1, wherein at least a portion of the gear operated coupler comprises a steel alloy.

7. The gear operated coupler as recited in claim 1, further comprising:
a shaft received in said pinion plate and supporting said pinion gear.

8. The gear operated coupler as recited in claim 1, further comprising a retention ring attached to said sleeve and to said pinion plate.

9. The gear operated coupler as recited in claim 1, further comprising a compensation ring configured to be at least partially received within said sleeve.

10. The gear operated coupler as recited in claim 1, wherein the means for preventing rotational movement includes at least one guide pin received in said pinion plate and configured and arranged to engage one of the first and second coupling portions.

11. A mechanical assembly, comprising:
a first coupling portion;
a second coupling portion configured to mate with said first coupling portion; and
a gear operated coupler, comprising:
a sleeve configured to receive said second coupling portion and to removably engage said first coupling portion;
a spur gear attached to said sleeve;
a pinion plate removably coupled to said second coupling portion;
a pinion gear configured to engage said spur gear; and
an operating nut connected at least indirectly to said pinion gear.

12. The mechanical assembly as recited in claim 11, wherein at least one of said first and second coupling portions defines a male pipe fitting.

13. The mechanical assembly as recited in claim 11, wherein at least one of said first and second coupling portions defines a female pipe fitting.

14. The mechanical assembly as recited in claim 11, wherein at least one of said first and second coupling portions defines a threaded pipe connection.

15. The mechanical assembly as recited in claim 11, wherein at least one of said first and second coupling portions defines a brazed pipe connection.

16. The mechanical assembly as recited in claim 11, wherein at least one of said first and second coupling portions defines a welded pipe connection.

17. The mechanical assembly as recited in claim 11, wherein said sleeve defines a set of internal threads, and said first coupling portion defines a set of external threads configured and arranged to engage the internal threads defined by said sleeve.

18. The mechanical assembly as recited in claim 11, wherein said sleeve includes a pin, and said first coupling portion defines a slot configured and arranged to at least partially receive said pin.

19. The mechanical assembly as recited in claim 11, wherein said spur gear is integral with said sleeve.

20. The mechanical assembly as recited in claim 11, wherein said first and second coupling portions form a metal-to-metal seal when coupled together by said sleeve.

21. The mechanical assembly as recited in claim 11, further comprising a compensation ring interposed between said sleeve and said second coupling portion when said second coupling portion is received within said sleeve.

22. The mechanical assembly as recited in claim 11, further comprising:
a shaft received in said pinion plate and supporting said pinion gear.

23. The mechanical assembly as recited in claim 11, further comprising a retention ring attached to said sleeve and to said pinion plate.

24. A mechanical assembly, comprising:
a first coupling portion;
a second coupling portion configured to mate with said first coupling portion and defining a guide slot; and
a gear operated coupler, comprising:
a sleeve configured to receive said second coupling portion and to removably engage said first coupling portion;
a spur gear attached to said sleeve;
a pinion plate removably attached to said second coupling portion;
at least one guide pin configured and arranged to be at least partially received within said guide slot defined by said second coupling portion;
a pinion gear configured to engage said spur gear;
a shaft received in said pinion plate and supporting said pinion gear; and
an operating nut connected at least indirectly to said pinion gear.

25. The mechanical assembly as recited in claim 24, wherein said at least one guide pin comprises a spring loaded guide pin.

26. A valve assembly, comprising:
a first coupling portion;
a second coupling portion configured to mate with said first coupling portion and defining a guide slot; and
a gear operated coupler, comprising:
a sleeve configured to receive said second coupling portion and to removably engage said first coupling portion;
a spur gear attached to said sleeve;
a pinion plate removably attached to the said second coupling portion;
a guide pin attached to said pinion plate and configured and arranged to be at least partially received within said guide slot defined by said second coupling portion;
a shaft received in said pinion plate;
a pinion gear mounted upon said shaft and configured to engage said spur gear; and
an operating nut connected at least indirectly to said pinion gear.

27. The valve assembly as recited in claim 26, wherein at least a portion of the valve assembly comprises a material selected from the group consisting of: steel; and, steel alloys.

28. A remote operation system suitable for use in connection with a piping system component that includes first and second coupling portions configured to be mated together, the remote operation system comprising:
 a gear operated coupler, comprising:
  a sleeve configured to receive said second coupling portion and to removably engage said first coupling portion;
  a spur gear attached to said sleeve;
  a pinion plate removably attached to said second coupling portion;
  a guide pin attached to said pinion plate and configured and arranged to be at least partially received within a guide slot defined by said second coupling portion;
  a shaft received in said pinion plate;
  a pinion gear mounted upon said shaft and configured to engage said spur gear; and
  an operating nut connected at least indirectly to said pinion gear; and
 a remote operator in communication with the gear operated coupler.

29. The remote operation system as recited in claim 28, further comprising at least one sensor in communication with said remote operator.

30. The remote operation system as recited in claim 28, wherein said remote operator is operably connected at least indirectly to said operating nut.

31. The remote operation system as recited in claim 28, wherein said remote operator comprises a hydraulic control system.

32. The remote operation system as recited in claim 28, wherein said remote operator comprises a mechanical linkage system.

33. A gear operated coupler for use in connection with a device having first and second coupling portions configured to be mated together, the gear operated coupler comprising:
 a sleeve configured to engage one of the first and second coupling portions, said sleeve comprising a set of internal threads configured and arranged for operative engagement with either the first or second coupling portion;
 a spur gear attached to said sleeve;
 a pinion plate removably linked to either the first or second coupling portion;
 a means for preventing rotational movement of said pinion plate relative to either the first or second coupling portion;
 a pinion gear configured to engage said spur gear; and
 an operating nut connected at least indirectly to said Pinion gear.

* * * * *

UNITED STATES PATENT AND TRADEMARK OFFICE
CERTIFICATE OF CORRECTION

| | |
|---|---|
| PATENT NO. | : 7,077,436 B1 |
| APPLICATION NO. | : 10/430458 |
| DATED | : July 18, 2006 |
| INVENTOR(S) | : Krywitsky |

It is certified that error appears in the above-identified patent and that said Letters Patent is hereby corrected as shown below:

<u>Title page</u>
Item 73, Assignee, change "Hilltap" to --Hiltap--

<u>Column 3</u>
Line 14, change "view an" to --view illustrating an--
Line 51, change "aid" to --and--
Line 61, change "generally however," to --generally, however,--

<u>Column 4</u>
Line 4, before "another" remove "a"
Line 59, change "106A" to --106--

<u>Column 5</u>
Line 7, change "114" to --104--

<u>Column 6</u>
Line 24, change "generally however," to --generally, however,--
Line 65, change "202" to --204--

<u>Column 7</u>
Line 12, change "assure" to --ensure--
Line 64, change "my" to --may--

<u>Column 8</u>
Line 6, after "nut" insert --of the gear operated coupler--

<u>Column 10</u>
Line 57, change "to the said" to --to said--

UNITED STATES PATENT AND TRADEMARK OFFICE
CERTIFICATE OF CORRECTION

PATENT NO. : 7,077,436 B1
APPLICATION NO. : 10/430458
DATED : July 18, 2006
INVENTOR(S) : Krywitsky It is certified that error appears in the above-identified patent and that said Letters Patent is hereby corrected as shown below:

<u>Column 12</u>
Line 23, change "Pinion" to --pinion--

Signed and Sealed this

Tenth Day of April, 2007

JON W. DUDAS
*Director of the United States Patent and Trademark Office*